Oct. 23, 1951     E. T. OAKES     2,572,049
APPARATUS FOR MAKING MARSHMALLOWS
Filed May 21, 1947     4 Sheets-Sheet 1

Inventor
EARLE T. OAKES

Oct. 23, 1951          E. T. OAKES          2,572,049
APPARATUS FOR MAKING MARSHMALLOWS
Filed May 21, 1947          4 Sheets-Sheet 2
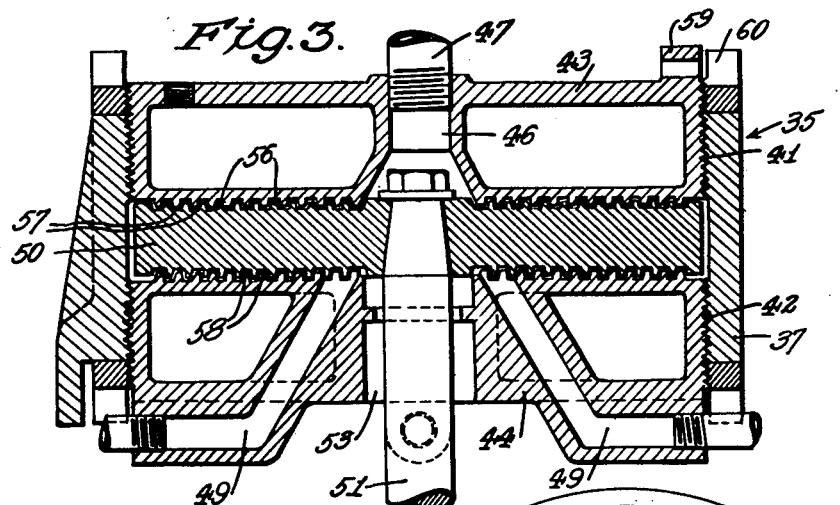
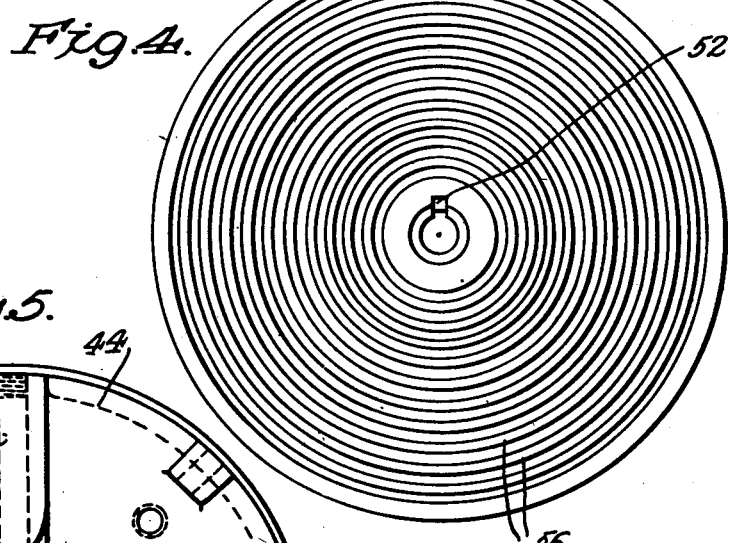
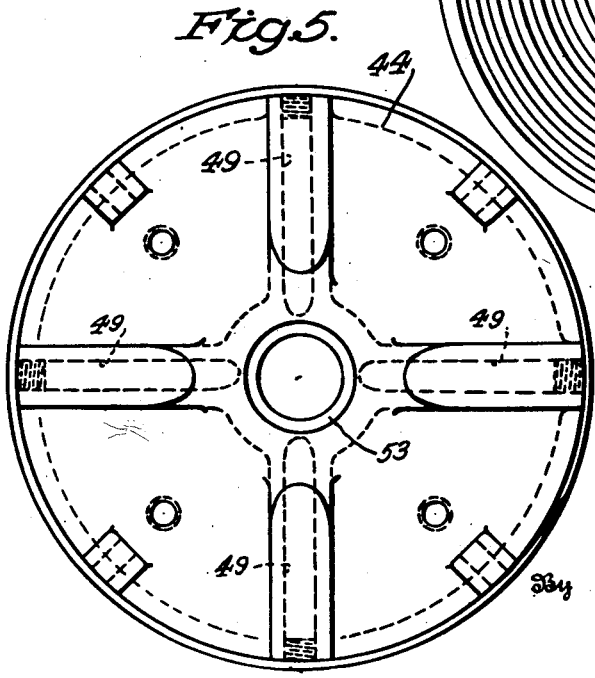
Inventor
EARLE T. OAKES
by
Campbell, Brumbaugh & Free
his Attorneys Oct. 23, 1951  E. T. OAKES  2,572,049
APPARATUS FOR MAKING MARSHMALLOWS
Filed May 21, 1947  4 Sheets-Sheet 3

INVENTOR
EARLE T. OAKES
BY
Campbell Brumbaugh & Free
his ATTORNEYS

Oct. 23, 1951          E. T. OAKES          2,572,049

APPARATUS FOR MAKING MARSHMALLOWS

Filed May 21, 1947          4 Sheets-Sheet 4

INVENTOR
EARLE T. OAKES

BY
*Campbell, Brumbaugh & Free*

*his* ATTORNEYS

Patented Oct. 23, 1951

2,572,049

UNITED STATES PATENT OFFICE 2,572,049

APPARATUS FOR MAKING MARSHMALLOWS

Earle T. Oakes, Douglaston, N. Y., assignor to E. T. Oakes Corporation, Douglaston, N. Y., a corporation of New York Application May 21, 1947, Serial No. 749,555

10 Claims. (Cl. 261—28)

This invention relates to improvements in methods and apparatus for mixing sticky, viscous or plastic materials. It relates more particularly to methods and apparatus for converting marshmallow mixes continuously into marshmallow suitable for filling and coating cakes and cookies or for use as candies alone, or as fillings or coatings for such candies.

This is a continuation-in-part of application Serial No. 657,822, filed March 28, 1946.

Marshmallow is a rather peculiar and difficult substance to prepare in large quantities because of certain of its inherent characteristics. Inasmuch as marshmallow mixes are composed largely of sugar syrups, they tend to be sticky and viscous unless they are diluted with water to reduce their viscosity. In the undiluted state, the mixes cannot be beaten to the fluffy texture required in marshmallow. A marshmallow mix which contains sufficient moisture to render it easily beaten, has the disadvantage that it is relatively soft and when deposited on cakes, cookies, confections or used alone, it is not sufficiently stiff to be shape-retaining. This deficiency has to be overcome by drying the marshmallow after it is deposited or made up into candies.

The drying operation is involved and is time consuming.

Marshmallow candies are usually dried in starch trays or starch boxes. For the sake of economy, the starch is used over and over and it must be sieved and dried frequently to keep it in condition for drying the product. Despite the exercise of great precautions, the starch inevitably becomes contaminated and unsanitary after repeated use. Moreover, large quantities of starch and extensive storage space are required for the candy being dried, for the reason that the candy must be kept in the starch until the candy becomes shape-retaining.

The drying operation, the intensity or extent of the beating operation and variations in the mix cause a very wide variation in the density of the finished marshmallow. Therefore, it is customary in the candy industry to use packages for the candies which are large enough to hold a desired weight of marshmallow of a low density. Variations in density are compensated by varying the amount of marshmallow by weight that is packed in the box. Thus, a full package may have more marshmallow candy in it by weight than the weight indicated on the package or if the packages are filled accurately by weight, the package may only partially be filled. Either package is undesirable from the standpoints of sales and merchandising.

An object of the invention is to provide devices which are capable of mixing thoroughly many different types of viscous, sticky or plastic and flowable materials.

Another object of the present invention is to provide a device by means of which marshmallow of a desired density can be produced.

Another object of the invention is to provide a device for producing marshmallow continuously and in a more sanitary manner than was possible heretofore.

Another object of the invention is to provide a device wherein marshmallow of a predetermined density can be produced continuously.

Another object of the inventin is to provide a device that is capable of producing marshmallow of such water content that drying of the marshmallow is unnecessary.

A further object of the invention is to provide a method of making marshmallow whereby the marshmallow produced does not require drying and is of sufficient dryness and density to be shape-retaining.

Other objects of the invention will become apparent from the following description of a typical apparatus and method embodying the present invention.

In accordance with the present invention I have provided an apparatus and a method whereby a mixture of the ingredients required for marshmallow are worked, beaten and aerated at superatmospheric gas pressure to incorporate a gas into the mixture and convert the mixture into marshmallow. At the completion of the working operation, the marshmallow is subjected to a reduced pressure, for example, by discharging it into a zone at atmospheric pressure whereby the bubbles of air or gas in the marshmallow can expand and give the desired spongy and fluffy texture to the product.

I have found that by operating at superatmospheric pressure, it is possible to work or beat the marshmallow mix sufficiently to incorporate gas into it while the mix has a viscosity such that it could not be beaten with the prior types of marshmallow beaters. Due to the action of my device, I can reduce the water content of the mixture substantially and, in fact, use only the amount of water desired in the finished product. The low moisture content of marshmallow produced by my device and in accordance with my method obviates the drying of the marshmallow to impart stiffness or shape-retaining properties to it, and the marshmallow may be handled directly in marshmallow depositing or cutting devices for formation into candies directly or as toppings or coatings or filling for cakes, cookies, candies and the like. These products may be sugared or coated with starch or other edible material in the usual way and then packed directly in cartons without the necessity of drying the marshmallow.

The apparatuses have the further advantage of being readily adjustable at any time so that the density of the product can be regulated during beating to produce marshmallow of a desired density and texture continuously.

The apparatus may be used for mixing many other types of sticky, viscous or semi-plastic materials and for beating air or other gas into these materials.

For a better understanding of the present invention, reference may be had to the accompanying drawings in which:

Figure 3 is a view in section taken on line 3—3 of Figure 2;

Figure 4 is a plan view of the working rotor of the device;

Figure 5 is a bottom plan view of the bottom plate or end of the mixing device;

Figure 2:
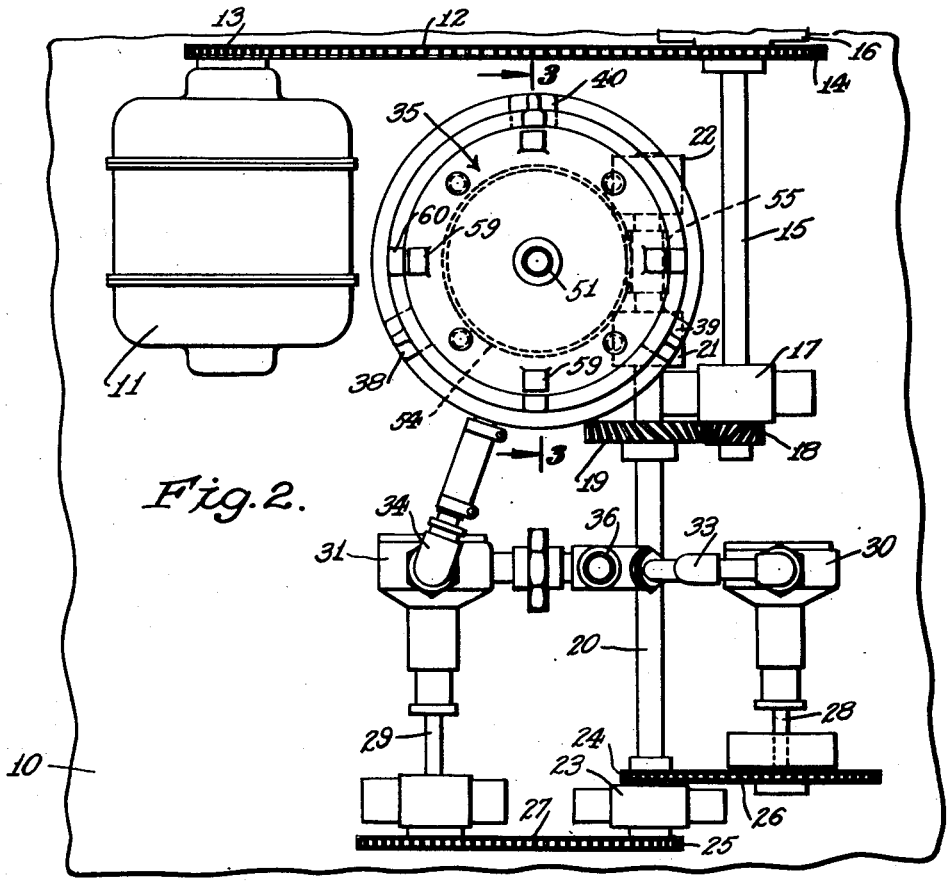
Figure 2 is a plan view of the device disclosed in Figure 1.
Figure 1:
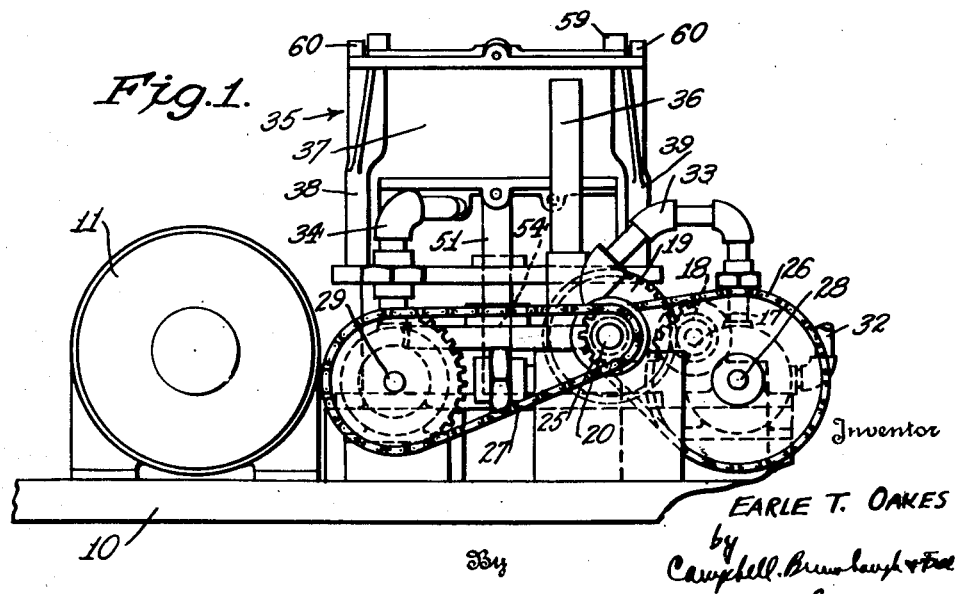
Figure 1 is a view in side elevation of a typical form of marshmallow making device embodying the present invention.

A typical mixing device embodying the present invention, as illustrated in Figures 1 and 2, may include a base plate 10 upon which is mounted an electric motor 11. The motor 11 is connected by means of a chain 12 and the sprockets 13 and 14 to a shaft 15 which is rotatably mounted in journals 16 and 17 mounted on the base plate 10. The shaft 15 is provided with a gear 18 which meshes with a second gear 19 carried by the main drive shaft 20 of the device. The shaft 20 is journaled at one end in suitable spaced apart journal blocks 21 and 22 and at its opposite end in a journal 23.

The shaft 20 is further provided with the sprockets 24 and 25 which are connected by means of the chains 26 and 27 to the impeller shafts 28 and 29 of the two pumps 30 and 31, respectively. The pump 30, as shown in Figure 1, has an inlet connection 32 for receiving the material to be mixed and delivering it through the outlet conduit 33 to the inlet of the pump 31. The pump 31 is also provided with an outlet 34 which is connected to an inlet of the mixing device 35 to be described hereinafter. The conduit 33 is also provided with a coupling and conduit 36 through which air or other gas may be delivered into the mixing device 35. The pump 31 is driven faster than the pump 30 so as to compensate for the air admitted into the mix and to compress the air as it is delivered with the mix into the mixing device 35.

Referring now to Figures 1, 3, 4 and 5, the mixing device may consist of a generally cylindrical shell member 37 which is supported on legs or standards 38, 39 and 40 connected with the base plate 10. If desired the shell may be provided with a water jacket, not shown. The shell 37 is provided with upper and lower internal threaded portions 41 and 42 into which the end plates 43 and 44, respectively, are threaded.

As shown in Figure 3, the end plate 43 may be hollow to form a jacket for receiving hot or cold water to regulate the temperature within the mixing device 35. The end plate 43 is provided with a central opening 46 for receiving a conduit or coupling 47 through which the marshmallow is discharged.

The bottom plate 44 is also hollow for receiving hot or cold water as may be desired. The end plate 44 is further provided with a plurality of passageways 49, each of which extends from the mid-portion of the plate 44 through the plate 44 to the opposite side of the plate adjacent to its periphery.

A disk-like or generally cylindrical rotor member 50 is mounted between the end plates 43 and 44 on a shaft 51 by means of the spline 52 and a nut and washer. The shaft 51 may be mounted in a suitable leakproof bushing or bearing, not shown, within the aperture 53 in the center of the end plate 44 and at its lower end in a suitable thrust bearing, not shown.

The shaft 51, as illustrated in Figure 1 is provided with a worm gear 54 which meshes with and is driven by means of the worm 55 that is mounted on the main drive shaft 20 between the journals 21 and 22.

The rotor 50 is provided with a plurality of concentric annular ribs 56 on its upper and lower surfaces, these ribs being staggered with respect to and interfitting with similar ribs 57 on the upper plate 43 and ribs 58 on the upper surface of the plate 44 as best shown in Figure 3. The arrangement of the ribs 56, 57 and 58 provides tortuous paths radially of the rotor through which the mix must pass. When the rotor 50 is rotated, the mix is subjected to an intensive working, pulling and kneading as it flows between the rotor 50 and the end plates 43 and 44. To increase the beating capacity, the adjacent surfaces of the rotor 50 and the end plates 43 and 44 may be knurled or roughened to increase the kneading action.

The intensity of the working can be varied considerably by adjusting the spacing between the end plates 43 and 44 and the working surfaces of the rotor 50. The end plates may be rotated to thread them toward or away from the rotor until a desired spacing is obtained. Once this spacing has been obtained, the end plates 43 and 44 can be locked in position by passing a pin, for example, through one of the lugs 59 on the end plate 43 and through the spaced apart lugs 60 on the edge of the shell 37. The end plate 44 may be adjusted and locked in position in a similar way. The adjustment of the bottom plate 44 will bring one of the passages 49 close to the outlet of the pump 31 so that the pump may be connected to the passage by means of a flexible coupling 61.

In operation, the marshmallow mix is introduced from a tank or hopper, not shown, through the inlet conduit 32 and through the pumps 30 and 31 into one of the passages 49 in the bottom plate 44, the other passages being closed by suitable plugs. The rotor 50 is rotated in unison with the pumps and the marshmallow mixture, therefore, is moved gradually outwardly between the ribs 57 and 58 at the same time being kneaded and worked and pulled due to its adherence to the ribs on the rotor and the end plate 44. The mixture flows upwardly around the periphery of the rotor 50 and inwardly toward the center of the rotor 50 between the ribs 56 and 57 thereby being worked and beaten. Inasmuch as air or other gas under pressure is introduced into the mixer 35 through the conduit 36, the mix is subjected to superatmospheric pressure and air is beaten uniformly into the mixture. If desired, compressed air can be introduced through one or more of the passages 49 and the pump 31 and the air inlet 36 can be omitted.

As the marshmallow flows outwardly through the opening 46 and conduits 47, the pressure on the mixture is reduced and as a result the air bubbles within the mixture expand and render the mixture fluffy and porous.

During the operation, the mixture may be maintained at a desired temperature by introducing hot or cold water into the hollow end plates 43 and 44 and into the jacket on the shell 37, if a jacket is provided.

The device described above can be cleaned readily by removing the end plates 43 and 44 so that access can be had to all of its interior and exterior surfaces. Inasmuch as the surfaces that are in contact with the marshmallow mix are enclosed, there is less danger of contamination of the device than with those devices heretofore used which usually are of open construction to facilitate introduction of air into the mixture. Moreover, since the air is under pressure in the applicant's device it can be beaten into the mixture more readily than can air at atmospheric pressure even though the marshmallow mix is more viscous than the mixes commonly used. Furthermore, since the marshmallow is under pressure as it comes from the mixer, it can be piped to the depositing equipment and released into the hopper of such depositing equipment. This obviates the necessity for the unsanitary handling of the marshmallow from the ordinary beaters, as is customarily done where the operator's hands and arms are invariably used in scooping the marshmallow into the hoppers.

The mixing device is susceptible to modification and its elements can be rearranged to produce more compact and convenient access and assembly. A modified form of mixing device which is capable of equivalent beating and agitation and which has improved facilities and accessibility for cleaning and the like is illustrated in Figures 6 to 9 of the drawings.

Figures 6, 7:
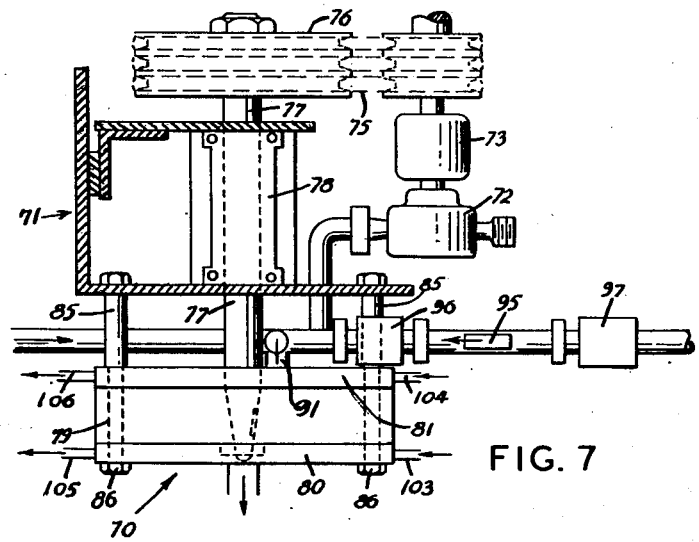
Figure 6 is a view in front elevation, and partly broken away of a modified type of mixing device.
Figure 7 is a top plan view of the device shown in Figure 6 with a portion of the casing omitted.

In this form of mixing device, the mixing and agitating mechanism 70 is mounted on the exterior of a casing 71 formed of sheet metal, for example, with suitable reinforcements. The agitator 70 is mounted, as shown in Figures 6 and 7, with its axis substantially horizontal. The casing 71 is adapted to enclose a pump 72 for delivering the marshmallow mix or other viscous or plastic material to the mixing device 70. The pump 72 is driven by means of a motor 73 mounted behind the pump 72, which also drives a pulley 74. The pulley 74 is connected by means of V-belts 75 to a larger pulley 76 that is fixed to a shaft 77 journalled in a bearing 78 mounted within the casing 72. The rotor of the mixing device 70 is mounted on the outer end of the shaft 77.

Figure 9:
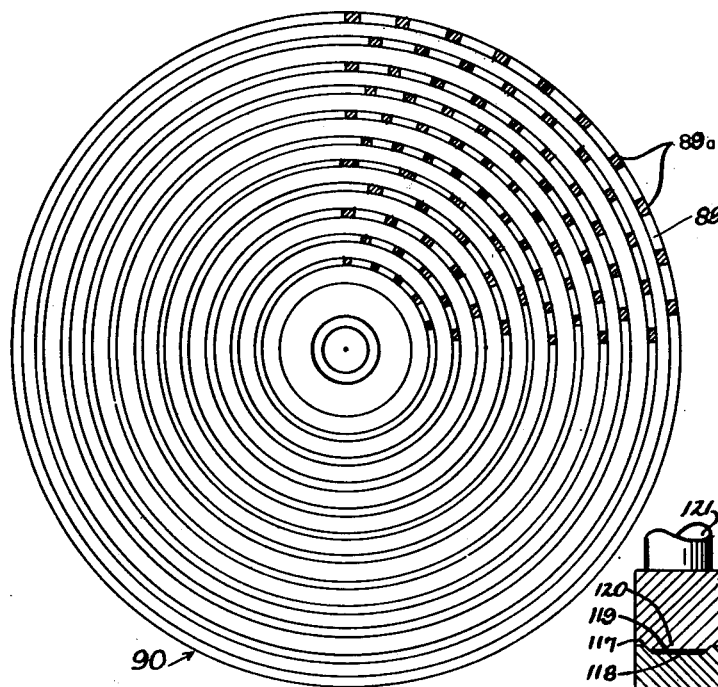
Figure 9 is a plan view of the rotor of the mixing device.
Figure 8:
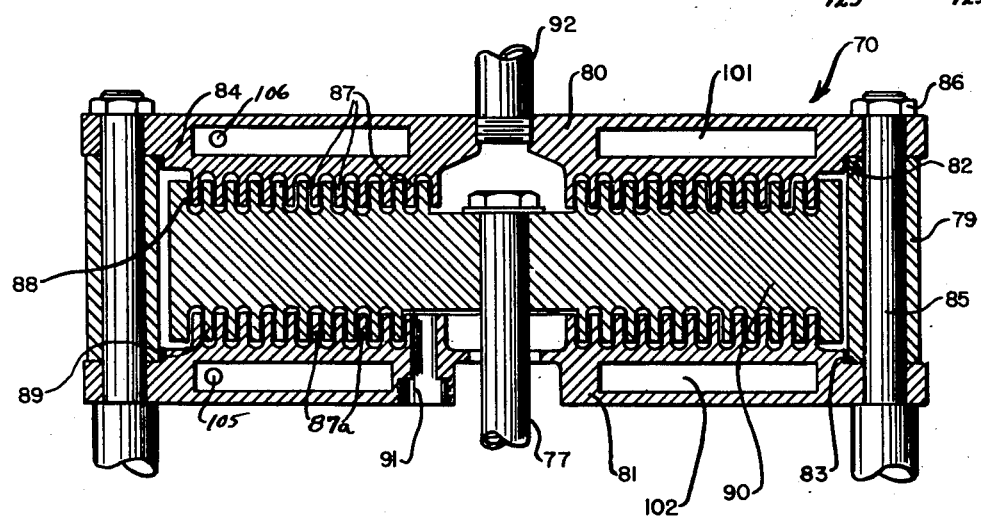
Figure 8 is a view in section taken on a diameter of the mixing chamber.

Referring now to Figures 8 and 9, the mixing device 70 includes a ring-like side wall member 79 which is interposed between the edges of a pair of end plates 80 and 81. The end plates are provided with annular shoulders 82 and 83 which bear against the inner edges of the ring 79 and may be sealed thereto by means of suitable packing rings 84 at each edge of the ring 79.

The two end plates 80 and 81 are clamped to the wall member 79 by means of elongated bolts 85 which are mounted at one end in the wall of the housing 72 and have reduced portions extending through bores in the end plates 80 and 81 and the wall member 79. Nuts 86 are threaded on the ends of the bolts 85 to clamp the elements of the agitator 70 together.

The end plates 80 and 81 are provided with inwardly extending annular rib elements 87, 87a which cooperate with oppositely facing rib-like assemblies or agitating vanes 88 and 89 on opposite sides of the rotor 90 in the same way as the corresponding agitating rings of the device shown in Figures 1 to 5. The rotor 90, as referred to previously, is fixed to the shaft 77 for rotation therewith. The rib-like agitating elements 87, 87a, 88 and 89 on the end plates 80 and 81 and the rotor 90 differ from the corresponding elements of the device disclosed in Figures 1 to 5 in that all or some of the agitating ribs 87, 87a, 88 and 89 are formed of a series of spaced apart teeth 89a, as best shown in Figure 9.

The mixture to be agitated is introduced through the tubular passage 91 in the end plate 81 which is adjacent to the shaft 77, so that the mixture flows outwardly with respect to the end plates and rotor 90, around the end of the rotor and then back toward the center of the end plate 80 and out the discharge conduit 92. It will be understood that the shaft 77 will be mounted in a suitable packing to prevent leakage of the mixture in a direction away from the agitating mechanism 70.

As shown in Figures 6 and 7, the mixture is forced by the pump through the conduit 93 into the opening or passage 91 and at the same time air under pressure is introduced through the conduit 94 into the opening 91. The conduit 94 may be provided with a suitable gauge 95 and pressure-reducing and control valve 96 and air filter 97 of the conventional type.

The mixture flowing out through the conduit 92 may be delivered to any suitable type of machine, such as, for example, a depositor, a molding machine or the like. The conduit 92 may be provided with a thermometer 98, a pressure gauge 99 and a control valve 100 in order to regulate the condition of the plastic or viscous material leaving the agitator 70.

It should be noted that the agitator 70 operates in a slightly different manner than the agitator 35 in that the material being mixed does not necessarily have to follow a tortuous path over the ends of the rib-like agitating members. However, when the plastic material flows through the gaps between the teeth 89a, it is subjected to intensive shearing action which tends to mix the air very thoroughly with the plastic material so that a spongy and porous texture is imparted to the material being agitated. Of course, plastic and viscous materials can be agitated in the device without the introduction of air into it.

Inasmuch as the characteristics of the materials being agitated may vary considerably, the end plates 80 and 81 may be provided with heating or cooling jackets 101, 102, into which a heating or cooling fluid can be delivered by means of the inlets 103 and 104 and discharged through the outlets 105, 106.

Figure 10:
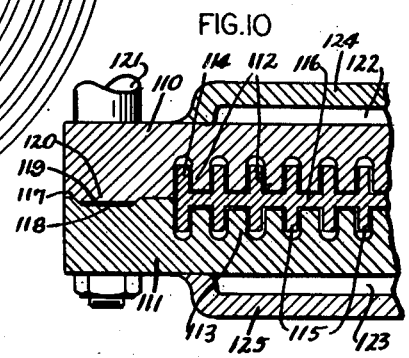
Figure 10 is a view in section taken radially through a modified form of mixing and agitating device.

A modified and somewhat more simple form of the agitating device is disclosed in Figure 10. In this device, the casing of the agitator consists of two disc-like plates 110 and 111 which have their inner surfaces milled or otherwise formed to provide the annular ribs 112 and 113 which cooperate with the ribs 114 and 115 on the rotor 116. The ribs 112, 113, 114 and 115 may either be continuous or interrupted, as described above.

The inner face 117 of the plate 111 is provided with an annular groove 118 which is adapted to receive a gasket 119 and a slightly shallower annular projection 120 on the plate 110 to effect a leak-proof seal when the plates 110 and 111 are clamped together by means of the bolts 121.

The plates 110 and 111 may be provided with heating or cooling jackets 122 and 123 formed of dished plates 124 and 125 welded at their edges to the backs of the plates 110 and 111.

The rotor 116 may be supported and driven, as described above, and the material to be mixed is introduced and discharged, also as described above.

In practicing the method of my invention, the marshmallow mix may be made up in the usual way of sugar syrups, flavoring and other essential ingredients, such as gelatin, soy bean protein or egg white, and water in the proportion desired in the final product. Thus, for example, marshmallow candies normally contain about 18 per cent moisture. The mixes from which they are made usually contain about 25 per cent moisture so that about 7 per cent of the moisture must be removed by drying after the mixing operation is completed.

Usually, the marshmallow for cake fillings, cookies, toppings, fillings and coatings contain about 27 to 30 per cent moisture. The mixture from which these fillings and coatings are made normally contains initially between 28 and 33 per cent moisture so that 1 to 6 per cent moisture must be removed by a drying operation.

In accordance with my method, the marshmallow mix for marshmallow candies may be prepared initially with 18 per cent moisture and when beaten under superatmospheric pressure results in a marshmallow candy product containing only 18 per cent moisture. Such candy can be packaged directly without drying.

In the preparation of cake and cookie toppings, fillings and coatings, the marshmallow may be prepared with the desired moisture content and used directly for coating and filling operations without a subsequent drying operation. In either case, the deposited or shaped marshmallow may be dusted with starch, sugar or other edible material in the usual way to protect it and improve its appearance.

From the preceding description, it will be apparent that I have provided devices and methods whereby marshmallow may be produced continuously with predetermined characteristics such that subsequent drying of the products is not required.

It will be understood that the apparatuses disclosed herein are susceptible to considerable modification in the size and design of the parts and that they may be used for mixing many materials and compositions other than marshmallow. Thus, the size, shape and number of ribs on the working faces of the rotor and end plates of the devices may be varied considerably, the drive mechanism may be altered if desired, and the devices may be heated or cooled as may be required. Therefore, the typical devices and method disclosed herein should be considered as illustrative of the invention and not as limiting the scope of the following claims.

I claim:

1. A mixing device comprising a substantially annular shell, a rotor rotatably mounted within said shell, means for rotating said rotor, an inlet end plate and an outlet end plate threaded into said shell on opposite sides of said rotor for adjustment toward and away from said rotor, substantially concentric ribs on adjacent faces of said rotor and of the end plates, the ribs on said rotor being interposed between the ribs on said end plates to define a tortuous path radially of said rotor, means for introducing material through said inlet end plate near the center thereof, means in said inlet plate for introducing a gas under pressure between the inlet plate and the rotor adjacent the center thereof, and means for discharging said material adjacent to the center of the outlet end plate.

2. A mixing and aerating device comprising a substantially annular shell, a rotor rotatably mounted within said shell, means for rotating said rotor, inlet and outlet end plates mounted on said shell on opposite sides of and adjustable toward and away from said rotor, complemental substantially concentric ribs on adjacent faces of said rotor and of the end plates defining a tortuous path radially of said rotor, means for introducing material through said inlet end plate near the center thereof, means for introducing gas under pressure through said inlet end plate into said shell, and means for discharging said material adjacent to the center of the outlet end plate.

3. A mixing device comprising a substantially annular shell, a rotor rotatably mounted within said shell, means for rotating said rotor, inlet and outlet end plates detachably mounted on said shell on opposite sides of said rotor, substantially concentric ribs on adjacent faces of said end plates and said rotor, the ribs on said rotor being interposed between the ribs on said end plates and the ribs on said rotor and said end plates being interrupted to form a plurality of annular rows of teeth, means for introducing material between said inlet end plate and said rotor at about the mid-portion of said inlet end plate, and means for discharging said material adjacent to the center of the outlet end plate.

4. A mixing device comprising a substantially annular shell member, an inlet end plate and an outlet end plate detachably mounted on opposite sides of said shell member, forming therewith a mixing chamber, a shaft extending through said inlet end plate and having an outer free end, a rotor fixed to the outer end of said shaft between said end plates and concentric with the latter, concentric interposed ribs on said rotor and said end plates defining a tortuous path between said rotor and said end plates, an inlet conduit at about the mid-portion of said inlet end plate for introducing material to be agitated, a discharge conduit at about the mid-portion of the outlet end plate, and means for rotating said shaft to cause material flowing from said inlet conduit to said outlet conduit to be kneaded, stretched and worked.

5. A mixing device comprising a substantially annular shell member, an inlet end plate and an outlet end plate detachably mounted on opposite sides of said shell member, forming therewith a mixing chamber, a shaft extending through said inlet end plate and having an outer free end, a rotor fixed to the outer free end of said shaft between said end plates and concentric with the latter, concentric interposed ribs on said rotor and said end plates defining a tortuous path between said rotor and said end plates, the ribs on said rotor and said end plates being interrupted to form a plurality of teeth, an inlet conduit at about the mid-portion of said inlet end plate for introducing material to be agitated, a discharge conduit at about the mid-portion of the outlet end plate, and means for rotating said shaft to cause material flowing from said inlet conduit to said outlet conduit to be kneaded, stretched and worked.

6. A mixing device comprising a substantially annular shell member, an inlet end plate and an outlet end plate detachably mounted on opposite sides of said shell member, forming therewith a mixing chamber, a shaft extending through said inlet end plate and having an outer free end, a rotor fixed to the outer free end of said shaft between said end plates and concentric with the latter, concentric interposed ribs on said rotor and said end plates defining a tortuous path between said rotor and said end plates, said rigs on said rotor and said end plates being interrupted to form a plurality of teeth, an inlet conduit communicating with the interior of said chamber adjacent the innermost rib on the inlet end plate for introducing material to be agitated, a discharge conduit at about the mid-portion of the outlet end plate, means to introduce gas under pressure into said chamber, and means for rotating said shaft to cause material flowing from said inlet conduit to said outlet conduit to be kneaded, stretched and worked.

7. A mixing and agitating device comprising an inlet end plate and an outlet end plate, a shaft extending through said inlet end plate and having an outer free end, a substantially cylindrical rotor mounted on said free end of said shaft between said end plates, means for rotating said rotor, interfitting substantially concentric complemental ribs on the ends of said rotor and the inner surfaces of said end plates defining tortuous paths of substantial width radially of said rotor, said ribs on said end plates and said rotor being interrupted to form spaced apart teeth, means detachably connecting said end plates to permit said end plates to be separated, means interposed between the edges of said end plates forming a liquid-tight seal therebetween, means for introducing material to be mixed through said inlet end plate adjacent to the center of said rotor, and means for discharging the material through the outlet end plate adjacent to the center of the rotor.

8. A mixing and aerating device comprising a shell including a pair of separate inlet and outlet end plates, a shaft extending through said inlet end plate and having an outer free end, a substantially cylindrical rotor mounted on said free end of said shaft between said end plates, means for rotating said rotor, interfitting substantially concentric complemental ribs on the ends of said rotor and the inner surfaces of said end plates defining tortuous paths of substantial width radially of said rotor, said ribs being interrupted to form spaced apart teeth on said end plates and said rotor, means detachably connecting said end plates to permit them to be separated for cleaning the rotor and interior of said shell, a pump for introducing material into said shell through said inlet end plate adjacent to the center of said inlet plate, means for discharging said material from the other end of said shell through said outlet end plate adjacent to the center of the outlet end plate, and means for introducing gas under pressure into said shell through said inlet end plate adjacent to the center thereof to maintain a superatmospheric pressure within said shell.

9. A mixing device comprising a supporting member, a power-driven shaft projecting outwardly from said member, a rotor on the outer end of said shaft, a shell including an inlet plate and an outlet plate on opposite sides of and enclosing said rotor, said shaft extending through said inlet plate and having an outer free end within said shell, interposed substantially concentric interrupted ribs on adjacent faces of said rotor and said plates defining a tortuous path radially of said shell, said ribs being interrupted to form annular rows of spaced apart teeth on said rotor and said plates, detachable fastening means extending outwardly from said member for securing said plates together in gas-tight relation and for supporting them on said member, means for introducing simultaneously liquid and gaseous materials under pressure through the inlet plate between it and the rotor adjacent the center thereof, and a discharge port substantially concentric with said rotor in the outlet plate.

10. A mixing and aerating device comprising a shell having an inlet end plate and a separate outlet end plate, said end plates having outer peripheral opposed flanges, a sealing gasket interposed between said flanges, fastening means engaging said flanges to clamp them together against said gasket in liquid and gas-tight relation, said fastening means being releasable to separate said end plates for cleaning, a rotor mounted in said shell between said end plates, means to rotate said rotor, substantially concentric ribs on adjacent faces of said end plates and said rotor, the ribs on said rotor being interposed between the ribs on said end plates and the ribs on said rotor and said end plates being interrupted to form a plurality of annular rows of teeth, a pump to introduce liquid and semi-liquid materials under pressure between said inlet end plate and said rotor at about the mid-portion of said inlet end plate, a source of gas at superatmospheric pressure, means to introduce said gas between said inlet end plate and said rotor at about the mid-portion of said inlet end plate, and means for discharging said material in admixture with said gas adjacent to the center of the outlet end plate.

EARLE T. OAKES.

REFERENCES CITED

The following references are of record in the file of this patent:

UNITED STATES PATENTS

| Number | Name | Date |
| --- | --- | --- |
| 581,206 | Hewitt | Apr. 20, 1897 |
| 1,080,445 | Hey | Dec. 2, 1913 |
| 1,471,697 | Kubes | Oct. 23, 1923 |
| 1,584,635 | Nagel | May 11, 1926 |
| 1,670,593 | Miller | May 22, 1928 |
| 2,245,112 | McLean | June 10, 1941 |
| 2,445,617 | Hofmann | July 20, 1948 |
| 2,478,893 | Brant | Aug. 16, 1949 |

FOREIGN PATENTS

| Number | Country | Date |
| --- | --- | --- |
| 2,650 | Austria | Nov. 10, 1900 |